United States Patent [19]

Kuwica

[11] Patent Number: 4,745,827
[45] Date of Patent: May 24, 1988

[54] FILE GUIDE FOR SAW CHAIN CUTTER TEETH

[76] Inventor: Daniel Kuwica, 1756 Shannon Court, Coquitlam, British Columia, Canada, V3J 6C6

[21] Appl. No.: 81,329

[22] Filed: Aug. 4, 1987

[51] Int. Cl.⁴ .............................................. B23D 63/10
[52] U.S. Cl. .......................................... 76/36; 33/202; 76/25 A
[58] Field of Search ........................... 76/25 A, 31, 36; 33/202

[56] References Cited

U.S. PATENT DOCUMENTS

| | | | |
|---|---|---|---|
| 2,737,830 | 3/1956 | Siverson | 76/36 |
| 3,365,805 | 1/1968 | Carlton | 76/31 |
| 4,177,697 | 12/1979 | McDunn | 76/36 |
| 4,473,958 | 10/1984 | Atkinson | 76/36 |
| 4,535,654 | 8/1985 | White | 76/36 |
| 4,646,589 | 3/1987 | Petitt, Jr. | 76/36 |

FOREIGN PATENT DOCUMENTS 533186 9/1931 Fed. Rep. of Germany ......... 76/31

Primary Examiner—Roscoe V. Parker
Attorney, Agent, or Firm—Shlesinger, Arkwright & Garvey

[57] ABSTRACT

A filing guide for a saw chain having inner links with spaces therebetween, outer links and cutter teeth. The filing guide comprises a rigid body with a front edge shaped to abut against the inner links and a pair of spaced-apart elongated members extending perpendicularly from the body adjacent the front edge. The members are shaped to fit within the spaces between the inner links and the body is shaped to glidably receive a round file so that a cutter tooth can be filed by the round file when the filing guide is positioned for use with the members inserted in the spaces between the inner links. The top of the body is flat.

34 Claims, 1 Drawing Sheet

U.S. Patent May 24, 1988 4,745,827
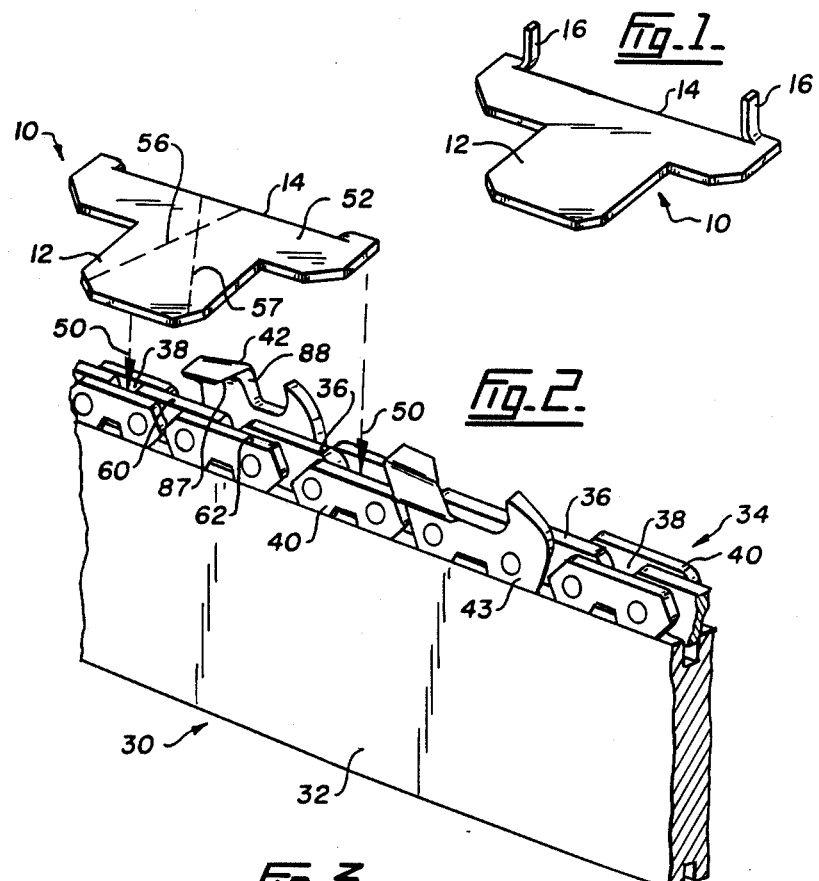
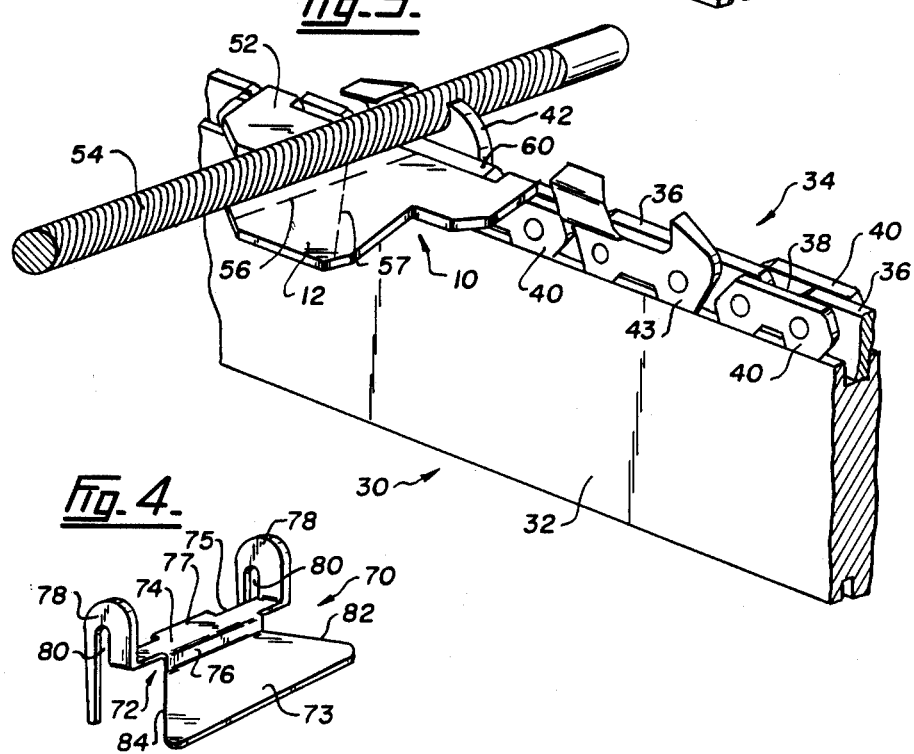

FILE GUIDE FOR SAW CHAIN CUTTER TEETH

FIELD OF THE INVENTION

The present invention relates to a filing guide for a chainsaw chain, and in particular to a filing guide for filing the cutter edges of cutter teeth.

BACKGROUND OF THE INVENTION

The cutter links or cutter teeth, as they are also known, of a standard chainsaw chain include a depth gauge and a cutter edge separated by a space. The cutter edge is normally sharpened or filed by use of a round file. One of the main difficulties involved in the sharpening of the cutting edges is the problem of maintaining uniformity in the curved cutting edges of the cutter teeth.

Devices have been developed for holding round files for sharpening the cutter edges of the cutter teeth. An example is found in U.S. Pat. No. 2,737,830 (Siverson et al.) which discloses a filing guide with a longitudinally extending slot therein, the slot enabling the guide to be placed around the tooth on the saw chain. Another example is U.S. Pat. No. 3,365,805 (Carlton) which discloses a saw chain filing guide comprising a flat plate having a slot to straddle a depth gauge and side plate on a cutter tooth to be sharpened. U.S. Pat. No. 4,473,958 (Atkinson) discloses a filing guide having a first slot adapted to receive the depth gauge and a second slot adapted to receive a safety projection.

Other patents of general interest are U.S. Pat. Nos. 4,412,463 (Beerens), 4,438,667 (Hannah), 3,283,615 (Kephart, Jr.), 4,228,702 (Stewart et al.), 3,670,600 (Arff), 3,438,286 (Silvon), 4,404,872 (Fritz) and 3,733,933 (Longbrake).

The prior art does not offer a solution which permits simple filing in the conventional manner where both hands are used on the file and without the need for holding a depth gauge of some kind and which can be used on essentially all chainsaw chains having a common pitch.

The prior art also does not offer a simple device which holds a round file in the proper position to file the cutter teeth and wherein the guide prevents the file from filing down into the inner links.

SUMMARY OF THE INVENTION

The present invention provides a filing guide for a saw chain having inner links with spaces therebetween, outer links and cutter teeth. The filing guide comprises a rigid body with a front edge shaped to abut against the inner links, and a pair of spaced-apart elongated members extending from the body adjacent the front edge. The members are shaped to fit within the spaces between the inner links, and the body is shaped to glidably receive a round file, so that a cutter tooth can be filed by the round file when the filing guide is positioned for use with the members inserted in the spaces between the inner links. In one embodiment, the top of the body is flat. The members are spaced apart a distance approximately the same as the lengths of two of the inner links and the space therebetween. The elongated members are integral with the body.

The filing guide may further include means for positioning the file at a 35 degree angle with respect to the cutter tooth. In the second embodiment, the means for positioning includes at least one side edge angled approximately 35 degrees from a line perpendicular to the front edge. Preferably, the body is constructed of hardened steel so that the file glides easily thereover when filing a cutter tooth. The thickness of the front edge is preferably approximately the distance between the top of an inner link and the top of an outer link so that the guide is flush with the tops of the inner links when the guide is positioned to file the cutter tooth.

BRIEF DESCRIPTION OF THE DRAWINGS

In the drawings, which illustrate embodiments of the invention:

FIG. 1 is a perspective view of a first embodiment of a filing guide with the elongated members pointing upwards;

FIG. 2 is a perspective view of the filing guide of FIG. 1, with the elongated members pointing downwards, the filing guide being positioned above a chainsaw chain;

FIG. 3 is a perspective view of the filing guide of FIG. 1 positioned for use on a chainsaw chain, with a round file thereon; and FIG. 4 is a perspective view of a second embodiment of the filing guide, with the elongated members pointing downwards.

DESCRIPTION OF THE PREFERRED EMBODIMENT

Referring to the drawings, FIG. 1 illustrates a filing guide 10, according to a first embodiment of the invention, which comprises a rigid body 12 which is constructed of hardened steel. The filing guide 10 has a front edge 14 and there is a pair of spaced-apart elongated members 16 extending from the body 12 adjacent the front edge 14. Members 16 are perpendicular to the plane of body 12 in this embodiment although for some chainsaw chains they are angled slightly from the perpendicular as described below. As shown in FIG. 1, the elongated members 16 are integral with the body 12.

As shown in FIGS. 2 and 3, a chain saw 30 includes a cutter bar 32 and an endless saw chain, generally designated as 34, extending therearound. The saw chain 34 has a plurality of drive links or inner links 36 with spaces or gaps 38 therebetween and a plurality of outer links 40 connected on each side of the inner links. The saw chain 34 also includes a plurality of cutter links or cutter teeth being interspersed at intervals with the outer links 40 and being staggered on both sides of the chain. FIGS. 2 and 3 show two non-chisel cutter teeth 42 and 43.

FIG. 2 shows the filing guide 10 positioned above the saw chain 34 with the elongated members 16 pointing towards the saw chain. The arrows 50 show where the elongated members 16 are inserted on the saw chain. The elongated members 16 are spaced-apart a distance approximately the same as the lengths of two of the inner links 36 and the space 38 therebetween, as shown best by the arrows 50 in FIG. 2.

The body 12 of the filing guide 10 is shaped to glidably receive a round file, in this case simply by providing a flat surface on a top portion 52. The top portion 52 has means for positioning a round file 54 at a 35 degree angle with respect to the cutter tooth to be filed. The means for positioning shown in FIGS. 2 and 3 is a pair of guide lines 56 and 57 inscribed onto the top portion 52. The guide lines 56 and 57 are each angled approximately 35 degrees from an imaginary line drawn perpendicular to the front edge 14. Most manufacturers of chainsaw chains recommend that the file be positioned at an angle of 35 degrees from a line drawn perpendicular to the cutter tooth for filing the cutting teeth. However, some people prefer to position the file at an angle of 30 degrees from a line drawn perpendicular to the cutter tooth. To accomplish this, the guide lines alternatively may be angled approximately 30 degrees from the line perpendicular to the cutter tooth.

FIG. 3 shows the filing guide 10 in position to file a cutter tooth 42 with the guide 10 being positioned perpendicular to the cutter tooth. The filing guide 10 does not contact the cutter tooth 42. The elongated members 16 have been inserted into the spaces 38. The thickness of the front edge 14 is approximately the distance between a top 60 of the inner link and a top 62 of the outer link, so that the filing guide 10 is flush with the tops 60 of the inner links when the guide 10 is positioned to file the cutter tooth 42. Front edge 14 is shaped straight to fit flush against the tops of the inner links.

If the file is positioned too low with respect to a top cutting angle 87 of the cutter tooth to be filed, a "hook" is produced in a side cutting angle 88 of the cutter tooth. This "hook" results in rough cutting, rapid dulling and a shorter life-span. If the file is positioned too high with respect to the top cutting angle 87 of the cutter tooth to be filed, the file will blunt the top cutting angle 87 of the cutter tooth, thereby resulting in slow cutting by the chainsaw and a greater effort to cut. This blunting also tends to cause excessive wear to the underside of the chain.

The filing guide 10 prevents the round file 54 from being positioned too low or too high with respect to the top cutting angle 87 of the cutter tooth to be filed because the guide is positioned opposite the cutter tooth to be filed, with the guide being flush with the tops of the inner links. The filing guide also prevents the file from filing down into the tops of the inner links which would cause weakness to the inner links, although because the guide 10 is flush with the tops 60 there is some contact between the file and the tops 60.

For non-chisel cutter teeth, most manufacturers recommend that the file be positioned perpendicularly to the saw chain and thus the members 16 are normally perpendicular to the plane of body 12 as described above. However, for chisel cutter teeth, most manufacturers recommend that the file be positioned at an angle less than 90 degrees, approximately 80 degrees, with respect to the saw chain. Special filing guides with the members 16 at 80 degrees to the plane of the body 12 could be provided, or the user could simply bend body 12 down 10 degrees after inserting the members 16 into the spaces 38.

FIG. 4 shows a second embodiment of the present invention. The filing guide 70 shown in FIG. 4 can be used with a safety-type chainsaw chain as well as conventional chainsaw chains and has a body generally designated as 72. The body 72 consists of a flat member 74 which is vertically spaced above a trapezoidal-shaped body portion 73. The flat member 74 is parallel to the body portion 73. The flat member 74 has a front edge 75. There is a rectangular projection 77 on the front edge 75 is shaped to fit flush against the tops of the inner links. A connection member 76 connects the flat member 74 to the body portion 73. There is an inverted J-shaped member 78 connected at each end of the flat member 74. The inverted J-shaped members 78 are integral with the flat member 74 and each J-shaped member 78 has an upwardly extending slot 80 therein.

The inverted J-shaped members 78 are spaced-apart a distance approximately the same as the lengths of two of the inner links 36 and the space 38 therebetween. The inverted J-shaped members 78 are perpendicular to the flat member 74 in this embodiment.

Special filing guides 70 with the members 78 at 80 degrees to the plane of the flat member 74 could be provided, or the user could simply bend the body portion 73 down 10 degrees after inserting the members 78 into the spaces 38.

The second embodiment, however, has a different means for positioning a round file at a 35 degree angle with respect to the cutter tooth to be filed. The means for positioning includes a pair of side edges 82 and 84 on the body portion 73 which are angled approximately 35 degrees from an imaginary line drawn perpendicular to the front edge 75, the side edges 82 and 84 being disposed on either side of the imaginary line.

The thickness of the front edge 75 is approximately the distance between the top 60 of the inner link and the top 62 of the outer link, so that the rectangular projection 77 is flush with the tops 60 of the inner links when the guide 70 is positioned to file a cutter tooth.

The filing guide 70 could also be provided with side edges angled approximately 30 degrees from a line drawn perpendicular to the front edge 75 so that the cutter tooth could be filed at an angle approximately 30 degrees from the cutter tooth.

OPERATION

To file the non-chisel cutter tooth 42 of the saw chain 34, the filing guide 10 is positioned on the saw chain as shown in FIG. 3. The members 16 are inserted into the spaces 38 adjacent the arrows 50. As can be seen, the members 16 are spaced apart a distance approximately equal to the lengths of two of the inner links 36 and a space 38 therebetween. When the filing guide 10 is located on the saw chain, as shown in FIG. 3, the guide 10 is flush with the tops 60 of the inner links because of the thickness of the edge 14. Thus, the filing guide prevents the file from filing down into the inner links. The user then places a round file 54 onto the filing guide 10 and employs the guide line 56, in this case, to ensure that the file 54 is at a 35 degree angle to the cutter tooth 42. If the cutter tooth 42 is a chisel cutter tooth, the user would push down the end of the guide remote from the edge 14 approximately 10 degrees, as discussed above. Once bent in this manner, the guide is adapted for teeth on both sides of the chain.

To file a cutter tooth, which is on the other side of the chain 34, the filing guide 10 is located on the saw chain 34 in the same way as described above. However, since the cutter tooth 43 is on a side of the saw chain opposite the cutter tooth 42, the filing guide 10 is rotated 180 degrees. The guide line 57 is employed to ensure that the round file 54 is at a 35 degree angle when filing cutter tooth 43.

The filing guide 70 is used in the same manner as the guide 10, except the file is placed on the flat member 74 and is aligned with side edge 84 of the guide when filing on the side of the chain illustrated in FIG. 3 or with the side edge 82 when filing a tooth on the opposite side of the chain.

It is to be understood that the invention is not confined to the particular construction and arrangements of parts as herein illustrated and described, but embraces all such modified forms thereof as come within the scope of the following claims.

What is claimed is:

1. A filing guide for a saw chain having inner links with spaces therebetween, outer links and cutter teeth, the filing guide comprising a rigid body with a front edge shaped to abut against the inner links, and a pair of spaced-apart elongated members extending from the body adjacent the front edge, the members being shaped to fit within the spaces between the inner links, the body being shaped to glidably receive a round file, whereby a cutter tooth can be filed by the round file when the filing guide is positioned for use with the members inserted in the space between the inner links.

2. A filing guide for a saw chain as claimed in claim 1, wherein the top of the body is flat.

3. A filing guide for a saw chain as claimed in claim 1, the members being spaced apart a distance approximately the same as the lengths of two of the inner links and the space therebetween.

4. A filing guide for a saw chain as claimed in claim 2, wherein the elongated members are perpendicular to the body.

5. A filing guide for a saw chain as claimed in claim 1, wherein each elongated member is in the shape of an inverted J and has an upwardly extending slot therein.

6. A filing guide for a saw chain as claimed in claim 1, the guide further including means for positioning the file at an angle equal to or slightly less than 35 degrees with respect to the cutter tooth to be filed.

7. A filing guide for a saw chain as claimed in claim 6, wherein the means for positioning includes a pair of guide lines inscribed onto the body, the guide lines being angled approximately 35 degrees from a line perpendicular to the front edge.

8. A filing guide for a saw chain as claimed in claim 6, wherein the means for positioning includes at least one side edge angled approximately 35 degrees from a line perpendicular to the front edge.

9. A filing guide for a saw chain as claimed in claim 1, wherein the body is constructed of hardened steel so that the file glides easily thereover when filing a cutter tooth.

10. A filing guide for a saw chain as claimed in claim 1, wherein the thickness of the front edge is approximately the distance between the tops of the inner links and the tops of the outer links, so that the guide is flush with the tops of the inner links when the guide is positioned to file the cutter tooth.

11. A filing guide for a saw chain as claimed in claim 1, wherein the filing guide maintains the file perpendicular to the saw chain for filing a non-chisel cutter tooth.

12. A filing guide for a saw chain as claimed in claim 1, wherein the elongated members are bendable so that the filing guide can be positioned at an angle less than 90 degrees with respect to the saw chain so that the file can file a chisel cutter tooth.

13. A filing guide for a saw chain having inner links with spaces therebetween, outer links and cutter teeth, the filing guide comprising a rigid body with a front edge shaped to abut against the inner links, a pair of spaced-apart elongated members extending from the body adjacent the front edge, the members being spaced-apart a distance approximately the same as the lengths of two of the inner links and the space therebetween, the body being shaped to glidably receive a round file, whereby a cutter tooth can be filed by the round file when the filing guide is positioned for use with the members inserted in the spaces between the inner links.

14. A filing guide for a saw chain as claimed in claim 12, wherein the top of the body is flat.

15. A filing guide for a saw chain as claimed in claim 13, wherein the elongated members are perpendicular to the body.

16. A filing guide for a saw chain as claimed in claim 13, wherein each elongated member is in the shape of an inverted J and has an upwardly extending slot therein.

17. A filing guide for a saw chain as claimed in claim 13, the guide further including means for positioning the file at an angle equal to or slightly less than 35 degrees with respect to the cutter tooth to be filed.

18. A filing guide for a saw chain as claimed in claim 17, wherein the means for positioning includes a pair of guide lines inscribed onto the body, the guide lines being angled approximately 35 degree from a line perpendicular to the front edge.

19. A filing guide for a saw chain as claimed in claim 17, wherein the means for positioning includes at least one side edge angled approximately 35 degrees from a line perpendicular to the front edge.

20. A filing guide for a saw chain as claimed in claim 13, wherein the body is constructed of hardened steel so that the file glides easily thereover when filing a cutter tooth.

21. A filing guide for a saw chain as claimed in claim 13, wherein the thickness of the front edge is approximately the distance between the tops of the inner links and the tops of the outer links, so that the top of the guide is flush with the tops of the inner links when the guide is positioned to file the cutter tooth.

22. A filing guide for a saw chain as claimed in claim 13, wherein the filing guide maintains the file perpendicular to the saw chain for filing a non-chisel cutter tooth.

23. A filing guide for a saw chain as claimed in claim 13, wherein the elongated members are bendable so that the filing guide can be positioned at an angle less than 90 degrees with respect to the saw chain so that the file can file a chisel cutter tooth.

24. In combination:
- a saw chain having cutter teeth, a plurality of inner links with spaces therebetween and a plurality of outer links connected on each side of the inner links, the cutter teeth being interspersed at intervals with the outer links and being staggered on both sides of the chain; and
- a filing guide for filing the cutter teeth of the saw chain comprising a rigid body with a front edge shaped to abut against the inner links, a pair of spaced-apart elongated members extending from the body adjacent the front edge, the members being spaced apart a distance approximately the same as the lengths of two of the inner links and the space therebetween, the body being shaped to glidably receive a round file, whereby a cutter tooth can be filed by the round file when the filing guide is positioned for use with the members inserted in the spaces between the inner links.

25. A filing guide for a saw chain as claimed in claim 24, wherein the top of the body is flat.

26. A filing guide for a saw chain as claimed in claim 25, wherein the elongated members are perpendicular to the body.

27. A filing guide for a saw chain as claimed in claim 24, wherein each elongated member is in the shape of an inverted J and has an upwardly extending slot therein.

28. A filing guide for a saw chain as claimed in claim 24, the guide further including means for positioning the file at an angle equal to or slightly less than 35 degrees with respect to the cutter tooth to be filed.

29. A filing guide for a saw chain as claimed in claim 28, wherein the means for positioning includes a pair of guide lines inscribed onto the body, the guide lines being angled approximately 35 degrees from a line perpendicular to the front edge.

30. A filing guide for a saw chain as claimed in claim 28, wherein the means for positioning includes at least one side edge angled approximately 35 degrees from a line perpendicular to the front edge.

31. A filing guide for a saw chain as claimed in claim 24, wherein the body is constructed of hardened steel so that the file glides easily thereover when filing a cutter tooth.

32. A filing guide for a saw chain as claimed in claim 24, wherein the thickness of the front edge is approximately the distance between the tops of the inner links and the tops of the outer links, so that the guide is flush with the tops of the inner links when the guide is positioned to file the cutter tooth.

33. A filing guide for a saw chain as claimed in claim 24, wherein the filing guide maintains the file perpendicular to the saw chain for filing a non-chisel cutter tooth.

34. A filing guide for a saw chain as claimed in claim 24, wherein the elongated members are bendable so that the filing guide can be positioned at an angle less than 90 degrees with respect to the saw chain so that the file can file a chisel cutter tooth.

* * * * *